United States Patent

[11] 3,586,912

| [72] | Inventor | Kurt H. Sennowitz |
| | | Royal Oak, Mich. |
| [21] | Appl. No. | 12,906 |
| [22] | Filed | Feb. 20, 1970 |
| [45] | Patented | June 22, 1971 |
| [73] | Assignee | Elox Inc. |
| | | Troy, Mich. |

[54] ELECTRICAL DISCHARGE MACHINING POWER SUPPLY CIRCUIT WITH PHASE CONTROL FOR GAP SHORT CIRCUIT PROTECTION
9 Claims, 2 Drawing Figs.

[52] U.S. Cl.............................................. 317/31,
317/33, 317/51, 219/69 C
[51] Int. Cl............................................... B23k 9/10
[50] Field of Search........................................... 317/31, 51,
33; 219/69 S, 69 P, 69 C, 507; 315/227 A

[56] References Cited
UNITED STATES PATENTS

| 3,217,207 | 11/1965 | Webb............................ | 317/31 X |
| 3,257,580 | 6/1966 | Webb............................ | 219/69 S X |
| 3,259,795 | 7/1966 | Schierholt..................... | 219/69 C X |
| 3,427,528 | 2/1969 | Custer............................ | 322/28 X |

*Primary Examiner*—J. D. Miller
*Assistant Examiner*—Harry E. Moose, Jr.
*Attorney*—Radford W. Luther ABSTRACT: An EDM circuit includes a pulsed power supply periodically connected to the machining gap. The supply includes a multiphase AC power supply which includes a plurality of semiconductor controlled rectifiers, each coupled between a different phase and the gap for successive firing to provide controllable current to the gap. A control system interrupts firing of all semicontrolled rectifiers responsive to the sensing of gap short condition.

INVENTOR
KURT H. SENNOWITZ
BY Harry R Dumont
ATTORNEY

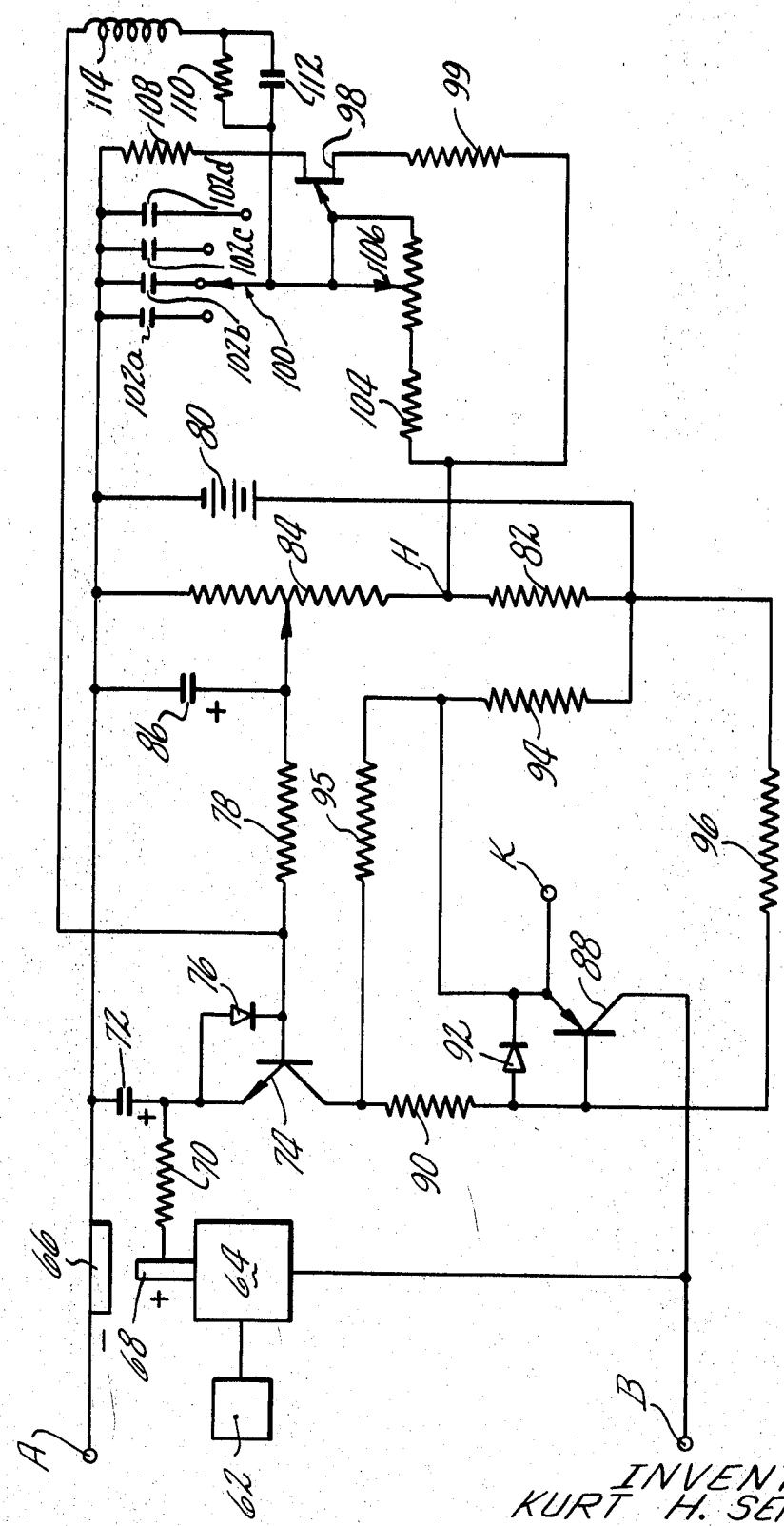

ELECTRICAL DISCHARGE MACHINING POWER SUPPLY CIRCUIT WITH PHASE CONTROL FOR GAP SHORT CIRCUIT PROTECTION

BACKGROUND OF THE INVENTION

The field to which my invention relates is that known as electrical discharge machining in which material is removed from an electrically conductive workpiece by the action of electrical gap discharges between a tool electrode and the workpiece. An electrode servo feed system is utilized to maintain an optimum gap spacing between electrode and workpiece as metal removal progresses. A dielectric coolant is circulated continuously through the gap during machining operation. Gap discharges are initiated by the periodic operation of an electronic switch to connect a DC power supply to the gap. One problem encountered in electrical discharge machining is that of the occurrence of gap short circuit condition when the electrode and workpiece come into contact, one with the other, or when the gap is temporarily bridged by particles from the workpiece. It is necessary to interrupt the power to stop the machining process and to withdraw the tool from the workpiece by operation of the servo feed system. To achieve the interruption of the power, a number of systems have been devised which variously cut off the conduction of the electronic switch, hold off its pulser or disconnect the power supply from the gap or the switch such as by the operation of an electrical relay or switch.

SUMMARY OF THE INVENTION

My invention provides for an improved AC phase control circuit which admits of ready control of the voltage and current of machining power pulses furnished to the gap. The phase control circuit incorporates semiconductor controlled rectifiers, which are adapted for ready and efficient cutoff control responsive to gap short circuit condition sensed in the gap.

BRIEF DESCRIPTION OF THE DRAWINGS

FIG. 2 is a schematic of an EDM power supply circuit with short circuit protective system adapted for use with the power supply of FIG. 1.

DESCRIPTION

Figure 1:
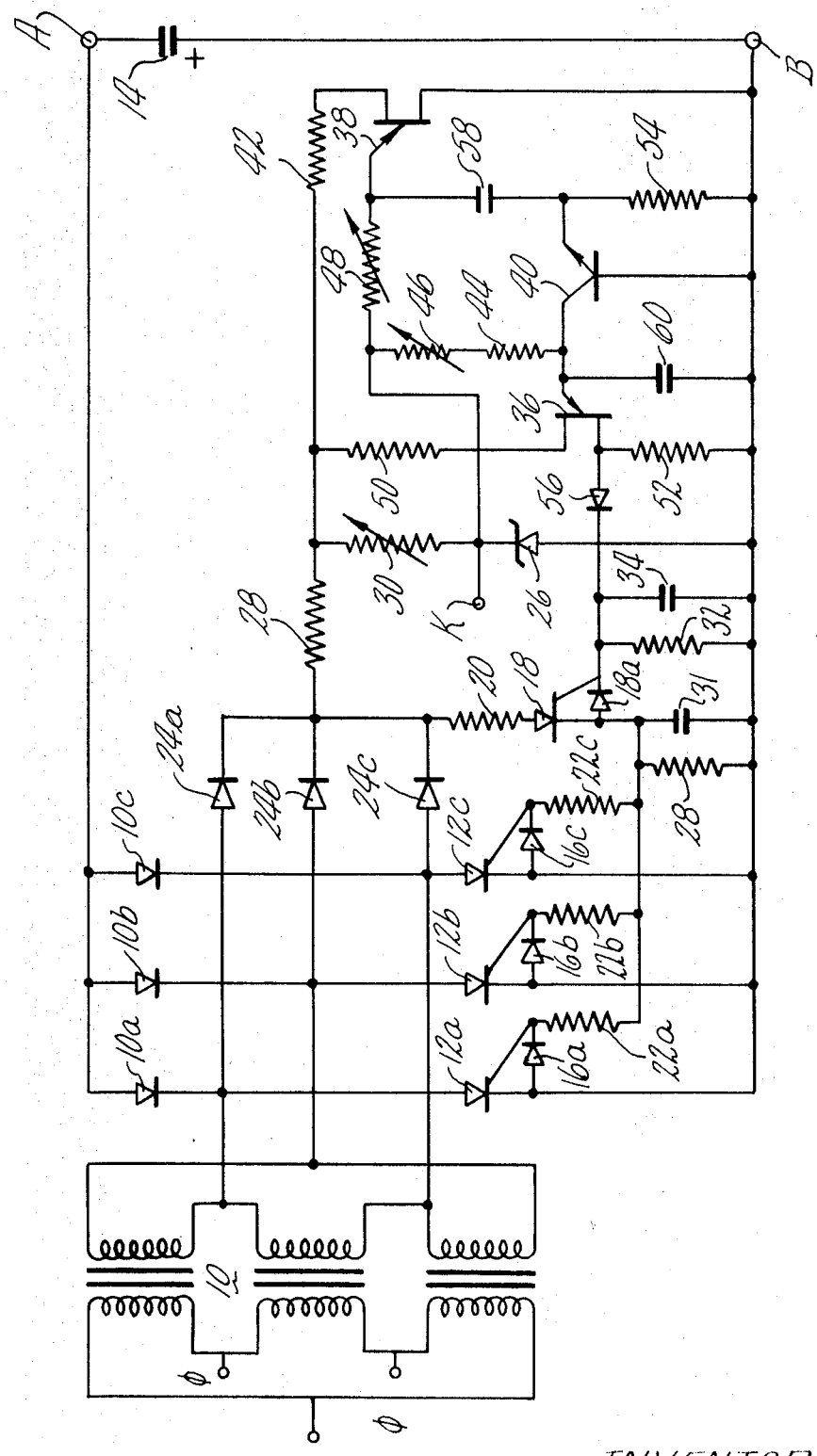
FIG. 1 is a schematic of a three phase AC power supply including a unijunction oscillator and firing control circuit for the SCR's employed.

Referring to FIG. 1, a three phase AC line transformer 10 connects a power input to the rectifier comprising diodes 10a, b, c and semiconductor controlled rectifiers 12a, b, c. Points A and B connect to like reference points A and B of FIG. 2 which are the minus and plus terminals of the DC supply coupled to the machining gap. Capacitor 14 is a filter capacitor. Diodes 16a, b, c protect the gate to cathode junctions of the SCR's from excess turnoff voltage. A fourth SCR 18 with its protective diode 18a is added to provide sufficient turn-on power for the high power SCR's 12a, b, c. Resistors 20 and 28 provide a limit for current flow through SCR 18. Capacitor 31 provides a smoother turn-on pulse for the SCR's. Equalizing resistors 22a, b, c are connected to the respective SCR gates. Diodes 24a, b, c are connected in the several phases to provide positive line voltage to the firing control circuit whenever the anode voltage on one of the SCR's goes positive with respect to the positive DC bus. This voltage is clipped by Zener diode 26. The magnitude of voltage is adjusted by fixed resistor 28 and variable resistor 30. The positive terminal of Zener diode 26 is connected to point K which corresponds to point K of FIG. 2 for a purpose which will be explained later in connection with the description of that circuit. RC bias network 32, 34 and coupling diode 56 are shaping the SCR 18 turn-on pulse.

A unijunction transistor relaxation oscillator firing circuit is provided which includes unijunction transistors 36, 38 and NPN transistor 40. Base 2 of transistor 38 is connected to a positive voltage through resistor 42. Voltage control is adjusted through fixed resistor 44 and variable resistor 46. The magnitude of variable resistor 48 is variable to set the firing angle of transistor 38 at slightly less than 120°. Base 2 of transistor 36 is also connected to a positive voltage through resistor 50. Bias resistors 32, 54 are included in the circuit as shown with diode 56 coupled in series between base 1 of transistor 36 and the gate electrode of SCR 18. The firing of SCR's 12a, b, c is accomplished by the discharge of capacitor 60 of the timing circuit through transistor 36 and resistor 52 as will be explained in the section "Description of Operation" hereinafter.

FIG. 2 shows the basic elements of an electrical discharge machining power supply circuit. This includes a pulser 62 and output switch 64 shown in block form. The respective negative and positive terminals of the power supply of FIG. 1 are indicated at points A and B, respectively. The polarity of the workpiece 66 is shown as negative and the electrode 68, positive. In a manner well known in the art, the output switch 64 is periodically turned on and off by the operation of pulser 62 to provide machining power pulses of controllable frequency and duration across the machining gap.

A gap voltage sensing network is connected across the gap which network includes resistor 70 and capacitor 72. A voltage signal representative of average gap voltage is applied to the emitter of NPN transistor 74. A protective diode 76 is coupled across the base emitter junction of transistor 74 to protect it from excess turnoff voltage. Resistor 78 is in series with the base of transistor 74 to limit drive current. A reference voltage source is provided by DC supply 80 and the divider network including resistor 82 and potentiometer 84. Capacitor 86 is connected to filter out ripple and provide a stable reference voltage. The function of transistor 74 and its associated circuit is to compare gap voltage signal with the reference voltage preset by potentiometer 84. A second transistor 88 is shown with its base connected through drive limiting resistor 90 to the collector of transistor 74. A protective diode 92 is connected across the base emitter of transistor 88. The emitter of transistor 88 is connected through resistor 94 to the positive terminal of DC source 80. Point K is connected to the emitter of transistor 88 and, with reference to FIG. 1, to the plus terminal of Zener reference diode 26, it will be seen that when transistor 88 is rendered conductive, it will short out diode 26 and the trigger supply voltage for SCR's 12a, b, c so that they cannot be turned on. A turnoff bias resistor 96 is further connected to the base of transistor 88 to maintain it nonconductive when transistor 74 is in its off state.

Included in FIG. 2 is a transistor oscillator including unijunction transistor 98. Resistor 99 is connected in series with the plus voltage supply and the base-two of unijunction transistor 98 to protect it from thermal runaway. A tap switch 100 is set to include one of a plurality of capacitors 102a, b, c or d in series with resistor 104 and a portion of the resistor of potentiometer 106 and thereby preset the frequency of operation of the oscillator. When the emitter voltage of transistor 98 reaches the potential of point H, transistor 98 will turn on and discharge the preselected capacitor 102 through resistor 108. The RC network including resistor 110, capacitor 112 and series inductor 114 couple the output pulse to the base of transistor 74.

DESCRIPTION OF OPERATION

The electronic triggering devices used in the illustrative embodiment of my invention are semiconductor controlled rectifiers but my invention is not so limited. By electronic triggering device I mean an electronic switch having at least two principal electrodes and a gate electrode. The device is triggered into its conductive state by an appropriate polarity pulse applied to its gate electrode. The device is subsequently turned off by a temporary interruption or reversal of polarity across the principal electrodes. Other electronic devices falling within this definition are ignitrons and the like. During the operation of the phase firing circuit of FIG. 1 a trigger pulse from the discharge of capacitor 60 through transistor 36 and resistor 52 is applied to fire SCR 18 and the voltage developed across resistor 28 is coupled to the gate of all three SCR's 12a, 12b and 12c so that whichever one of those three SCR's has the most positive anode voltage at the instant of the gate pulse starts conduction at that point. The circuit including transistors 40 and 38 prevents transistor 36 from firing at any delay angle greater than 120°. If triggering pulses are retarded beyond 120°, the output voltage rises abruptly to 100 percent as the following phase is fired at the beginning of its cycle. The oscillator including transistor 38 operates as an independent unijunction oscillator which initiates its timing cycle at the same time as transistor 36. The value of resistor 48 is set at a value so that transistor 38 fires at an angle slightly less than 120°. There are thus two modes of operation possible.

If transistor 36 triggers before the retard angle of 120°, it fires the SCR whose positive anode voltage is providing the interbase bias for the unijunction transistors through diodes 24a, b, c. The triggering of SCR 12a, b, or c shorts the control circuit supply voltage. This causes the interbase voltage of transistor 38 to drop to zero. This causes transistor 38 to fire and to discharge capacitor 58 in preparation for the next cycle of operation.

If transistor 36 triggers with a delay beyond 120°, transistor 38 fires, thus discharging capacitor 58 through the base emitter junction of transistor 40, thereby saturating it and discharging capacitor 60 through transistor 40. This alternate mode of operation does not impose a firing pulse on the SCR gates for firing and the DC output voltage remains zero. With the three phase AC supply of FIG. 1, the output voltage may be varied without steps over a broad range by the adjustment of rheostat 46. The additional advantages of this circuit with respect to gap short circuit protection for an electrical discharge machining power supply will now be discussed with reference to FIG. 2.

Upon an occurrence of an abrupt drop in gap voltage representative of gap short circuiting, the voltage signal stored on capacitor 72 of the sensing network will drop below the value of the reference voltage set on potentiometer 84, transistor 74 will be rendered conductive to provide, in turn, turn-on of transistor 88. In its conducting state, transistor 88 shorts out Zener diode 26 of the trigger for the SCR's of FIG. 1. There is no turn-on signal available for SCR 18. Accordingly, SCR's 12a, b and c will not be turned on at the 120° intervals normally occurring and the DC power output at terminals A and B will be dropped essentially to zero level for the duration of gap short circuit condition. In due time, backup of the servosystem will serve to clear the short circuit condition by separating the gap to an open circuit condition. Transistors 74 and 88 will return to their normally nonconducting states and normal gap voltage will reappear as the triggering voltage is again made available for the semiconductor controlled rectifiers of FIG. 1.

The function of the oscillator including transistor 98 is to provide low frequency pulsing "off" of transistor 74 during a gap short circuit condition or lower than normal gap voltage. This will permit the momentary enabling of the trigger circuit including Zener diode 26 and resultant normal phase control for that limited period. The line voltage will not rise to normal level but pulsing of this type serves to help break up impending gap short circuit condition.

For operation in the finishing mode at higher frequencies and lower current levels, the magnitude of the reference voltage control 84 may be set to cause it to interfere constantly with gap cutting. This has been found to permit low gap voltage operation at closer gap spacings with resultant improved surface finishes. During operation in the roughing mode, the reference at potentiometer 84 may be set at a different level to provide much less frequent current interruption.

It will thus be seen that I have provided an EDM power supply circuit both with respect to the phase control circuit and its incorporation in a novel and improved gap short circuit protection system.

I claim:

1. In an electrical discharge machining power supply circuit including a power supply and a periodically operated electronic switch coupled between said power supply and the machining gap, said power supply including a plural phase AC power source, a gap short circuit protective system wherein the improvement comprises a like plurality of electronic triggering devices with their principal electrodes coupled between said source and said gap, a control circuit coupled across a like principal electrode and the control electrode of all of said devices for firing them in controllable succession, a sensing network coupled to said gap for providing an output signal responsive to gap short circuit, and means coupled between said network and said control circuit for interrupting the firing of said devices responsive to said signal.

2. The combination as set forth in claim 1 wherein said control circuit includes a firing voltage source for said devices and wherein said last mentioned means comprises an electronic switch having its control electrode coupled to said sensing network and its principal electrodes connected across said firing voltage source for shunting it for the duration of said signal.

3. The combination as set forth in claim 1 wherein said sensing network comprises a resistor and a capacitor coupled across said gap for providing an output signal representative of average gap voltage.

4. The combination as set forth in claim 2 wherein said electronic triggering devices comprise semiconductor controlled rectifiers and said electronic switch comprises a transistor having its base operatively connected to said sensing network and its emitter and collector operatively coupled across said firing voltage source.

5. In an electrical discharge machining power supply circuit including a power supply and a periodically operated electronic switch coupled between said power supply and the machining gap, said power supply including at least one phase of alternating current potential, a gap short circuit protective system wherein the improvement comprises an electronic triggering device having a control electrode and having its principal electrodes connected between said phase of alternating current potential and said gap, a control circuit including a firing voltage source connected across said control electrode and one of said principal electrodes for rendering it conductive for controllable time durations, a sensing network connected to said gap for providing an output signal responsive to gap short circuit condition, and control means connected between said network and said control circuit for interrupting the firing of said device responsive to said signal.

6. The combination as set forth in claim 5 wherein said device comprises a semiconductor controlled rectifier having its anode and cathode connected between said phase and said gap, wherein said control circuit includes a firing voltage source for said controlled rectifier and wherein said control means comprises an electronic switch having its control electrode connected to said sensing network and its principal electrodes connected across said firing voltage source for shunting it responsive to said signal.

7. The combination as set forth in claim 5 wherein said control means comprises an electronic switch having its control electrode coupled to the output of said sensing network and its principal electrodes operatively connected to said firing circuit for preventing firing of said semiconductor controlled rectifier for the duration of said signal.

8. The combination as set forth in claim 7 wherein a pulser is operatively coupled to said electronic switch to periodically turn it on and off during continuance of said signal.

9. The combination as set forth in claim 5 wherein said firing circuit includes a unijunction transistor oscillator circuit operable at selectable frequencies.